US012732523B2

(12) United States Patent
Chesla et al.

(10) Patent No.: US 12,732,523 B2
(45) Date of Patent: Sep. 8, 2026

(54) GENERATION OF PREDICTIVE CYBERSECURITY DATA QUERIES

(71) Applicant: Cybereason Inc., Boston, MA (US)

(72) Inventors: Avi Chesla, Tel Aviv (IL); Elan Pavlov, Cambridge, MA (US)

(73) Assignee: Cybereason Inc., Boston, MA (US)

( * ) Notice: Subject to any disclaimer, the term of this patent is extended or adjusted under 35 U.S.C. 154(b) by 417 days.

(21) Appl. No.: 18/194,087

(22) Filed: Mar. 31, 2023

(65) Prior Publication Data

US 2023/0328095 A1 Oct. 12, 2023

Related U.S. Application Data

(60) Provisional application No. 63/362,260, filed on Mar. 31, 2022.

(51) Int. Cl.

| | |
|---|---|
| ***H04L 29/06*** | (2006.01) |
| ***G06F 16/2453*** | (2019.01) |
| ***G06F 16/28*** | (2019.01) |
| ***H04L 9/40*** | (2022.01) |

(52) U.S. Cl.

CPC .... *H04L 63/1433* (2013.01); *G06F 16/24539* (2019.01); *G06F 16/285* (2019.01); *H04L 63/1416* (2013.01); *H04L 63/1425* (2013.01)

(58) Field of Classification Search

CPC ............ H04L 63/1433; H04L 63/1416; H04L 63/1425; G06F 16/285; G06F 16/24539

See application file for complete search history.

(56) References Cited

U.S. PATENT DOCUMENTS

| | | | | |
|---|---|---|---|---|
| 10,834,128 | B1 * | 11/2020 | Rajagopalan | H04L 51/18 |
| 11,423,143 | B1 * | 8/2022 | Lin | G06F 21/552 |
| 11,956,255 | B1 * | 4/2024 | Holub | G06N 20/00 |
| 2009/0177667 | A1 * | 7/2009 | Ramos | G06F 16/24552 707/E17.046 |
| 2018/0012021 | A1 * | 1/2018 | Volkov | H04L 63/1416 |
| 2018/0046685 | A1 * | 2/2018 | Baluja | G06F 16/248 |
| 2018/0322283 | A1 * | 11/2018 | Puri | G06F 16/254 |
| 2019/0164092 | A1 * | 5/2019 | Argyros | G06F 3/0482 |
| 2021/0168160 | A1 * | 6/2021 | Wang | H04L 61/4511 |
| 2022/0124108 | A1 * | 4/2022 | Gamble | G06F 21/552 |
| 2022/0272125 | A1 * | 8/2022 | Tora | H04L 63/1483 |

(Continued)

OTHER PUBLICATIONS

Ouissem Ben Fredj et al., CyberSecurity Attack Prediction: A Deep Learning Approach, Feb. 1, 2021, ACM, pp. 1-6. (Year: 2021).*

(Continued)

*Primary Examiner* — Kari L Schmidt
*Assistant Examiner* — Fahimeh Mohammadi
(74) *Attorney, Agent, or Firm* — Banner & Witcoff, Ltd.

(57) ABSTRACT

A computing system identifies an evidence set associated with a detected cybersecurity attack. The evidence set includes logs representing security alerts associated with the detected cybersecurity attack. The computing system analyzes the evidence set to predict actions taken by a malicious actor, the actions comprising historical actions and future actions. The computing system analyzes the predicted actions to classify the historical actions and future actions taken by the malicious actor. The computing system generates a query for analyzing the evidence set based on the classified historical actions and future actions.

17 Claims, 8 Drawing Sheets

(56) References Cited

U.S. PATENT DOCUMENTS

| | | | | |
|---|---|---|---|---|
| 2022/0417261 | A1* | 12/2022 | Rashidi | H04L 63/1416 |
| 2023/0019072 | A1* | 1/2023 | Okunlola | G06N 20/00 |
| 2023/0113375 | A1* | 4/2023 | Thomas | G06F 21/552<br>726/23 |
| 2023/0396641 | A1* | 12/2023 | Hebbagodi | H04L 63/1408 |
| 2024/0143593 | A1* | 5/2024 | Shekhar | G06F 16/219 |

OTHER PUBLICATIONS

Chee-Wooi Ten et al., Cybersecurity for Critical Infrastructures: Attack and Defense Modeling, Jun. 3, 2010, IEEE, vol. 40, Issue: 4, pp. 853-865. (Year: 2010).*

Martin Husák et al., Survey of Attack Projection, Prediction, and Forecasting in Cyber Security, Sep. 24, 2018, IEEE, vol. 21, Issue: 1, pp. 640-660. (Year: 2018).*

Nan Sun st al., Data-Driven Cybersecurity Incident Prediction, Dec. 7, 2018, IEEE, vol. 21, Issue: 2, pp. 1744-1772. (Year: 2018).*

* cited by examiner

700

800

Storage Device
Serv. 1
Serv. 2
Serv. 3
830
832
834
836
805
Memory 815
ROM
RAM
820
825
Processor
810
Cache
812
Input Device
845
Output Device
835
Communication Interface
840
850

Communication Interface
890
RAM
875
Storage Device
870
Chipset
860
Processor
855
Output
865
Bridge
880
User Interface Components
885

GENERATION OF PREDICTIVE CYBERSECURITY DATA QUERIES

CROSS REFERENCE TO RELATED APPLICATIONS

This application claims priority to U.S. Provisional Application No. 63/362,260, filed Mar. 31, 2022, which is hereby incorporated by reference in its entirety.

FIELD OF DISCLOSURE

Embodiment disclosed herein generally relate to a system and method for generating predictive cybersecurity data queries.

BACKGROUND

As organizations and engineers identify ways for detecting and anticipating cyberattacks, malicious actors continue to find ways to both increase the frequency of their cyberattacks, as well as the sophistication of these cyberattacks. Given the ever evolving nature of malicious actors, it has become increasingly difficult for organizations to identify, detect, and investigate cyberattacks.

SUMMARY

In some embodiments, a method of generating investigative queries for a cybersecurity attack is disclosed herein. A computing system identifies an evidence set associated with a detected cybersecurity attack. The evidence set comprises logs that include security alerts associated with the detected cybersecurity attack. The computing system analyzes the evidence set to predict actions taken by a malicious actor. The actions include historical actions and future actions. The computing system analyzes the predicted actions to classify the historical actions and future actions taken by the malicious actor. The computing system generates a query for analyzing the evidence set based on the classified historical actions and the future actions.

In some embodiments, a non-transitory computer readable medium is disclosed herein. The non-transitory computer readable medium includes one or more sequences of instructions, which, when executed by a processor, causes a computing system to perform operations. The operations include identifying, by the computing system, an evidence set associated with a detected cybersecurity attack. The evidence set includes logs that include security alerts associated with the detected cybersecurity attack. The operations further include analyzing, by the computing system, the evidence set to predict actions taken by a malicious actor. The actions include historical actions and future actions. The operations further include analyzing, by the computing system, the predicted actions to classify the historical actions and future actions taken by the malicious actor. The operations further include generating, by the computing system, a query for analyzing the evidence set based on the classified historical actions and the future actions.

In some embodiments, a system is disclosed herein. The system includes a processor and a memory. The memory has programming instructions stored thereon, which, when executed by the processor, causes the system to perform operations. The operations include identifying an evidence set associated with a detected cybersecurity attack. The evidence set includes logs that include security alerts associated with the detected cybersecurity attack. The operations further include analyzing the evidence set to predict actions taken by a malicious actor. The actions include historical actions and future actions. The operations further include analyzing the predicted actions to classify the historical actions and the future actions taken by the malicious actor. The operations further include generating a query for analyzing the evidence set based on the classified historical actions and the classified future actions.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
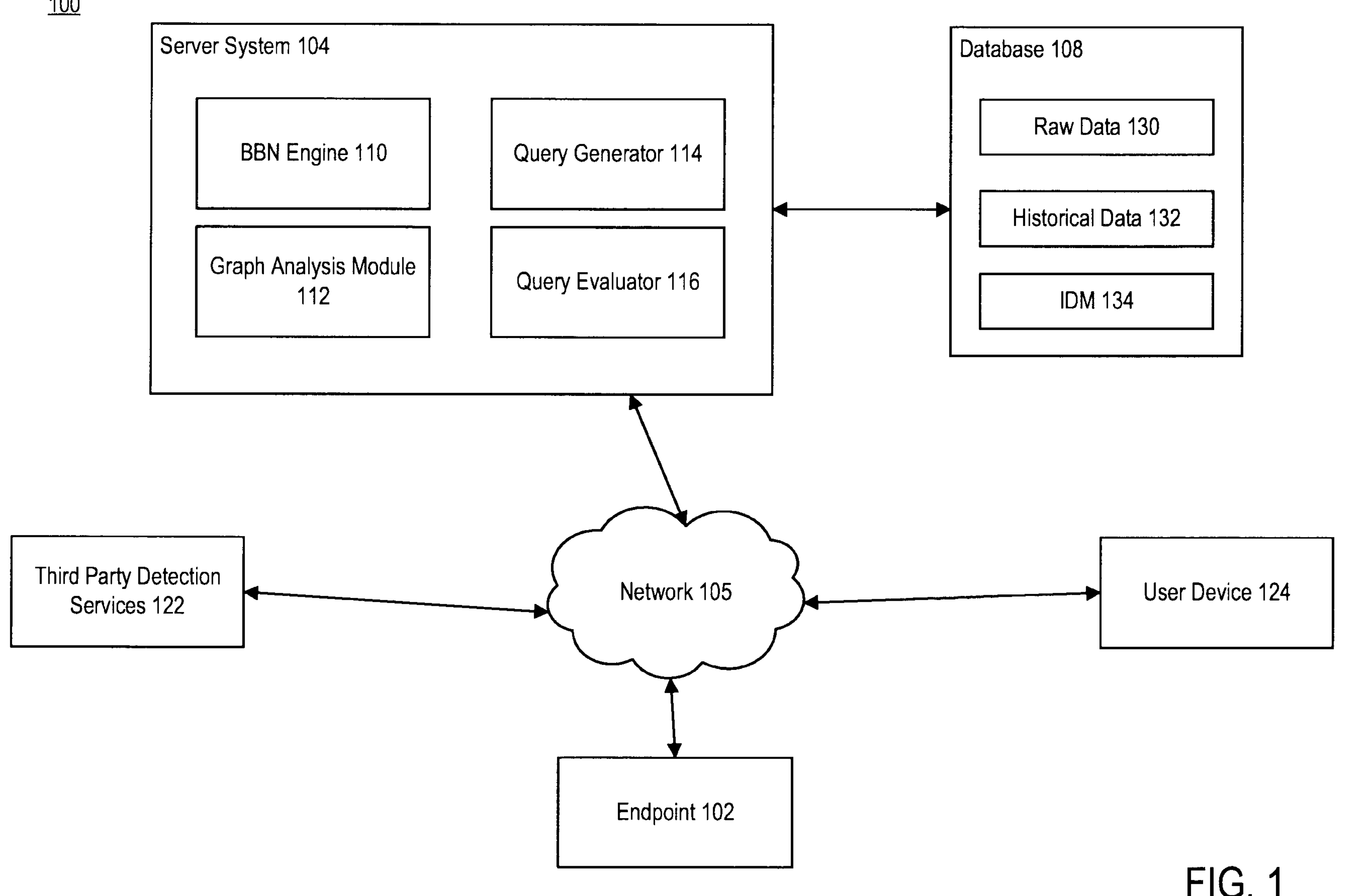
FIG. 1 is a block diagram illustrating a computing environment, according to one exemplary embodiment.

Frequency and sophistication of cyberattacks are on the rise over the last years. As a result, the time it takes organizations to detect, investigate, respond and contain attacks is way too long, and too late. This makes organizations extremely vulnerable to threats such as data theft and data manipulation, identity theft, ransomware and more.

One of the main reasons it is taking too long, is because the existing cyber-attack investigation methods are mainly manual in nature, and don't include the capability to "predict" (based on the collected data) the attacker's potential previous attacks steps, root cause of the attacks and potential attacker's next steps—therefore don't provide the security analysts with the ability (or guidance) to quickly search the most relevant data in order to find evidence to would help him or her in the attack investigation process.

Conventional approaches to investigation automation take the form of programmable, static, workflows (investigation play books) that are manually created by security experts and executed via systems like SOAR (Security Orchestration, Automation and Response) platforms. These conventional approaches typically demand a high level of security expertise and constant maintenance of static play books, a resource that most organizations don't have and therefore the overall quality and speed of the investigation process are poor. Because such approaches are static, conventional approaches are unable to automatically adapt to the detect attack context.

As a result, there is a need to allow less sophisticated analysts to make complicated and informed investigation queries.

Further, conventional approaches typically involve high operational cost. For example, conventional approaches typically require constant programing and maintenance of investigation workflows (play books) rules. Further, the mean time to investigate becomes longer, which leaves that organization vulnerable to cyber attacks. As such, organizations must increase their speed of reaction to such cyber attacks.

Therefore, it would be useful to provide a solution that would allow organizations to suggest and predict what will be the most relevant investigation data queries.

One or more techniques described herein provide an improvement over conventional systems by predicting search queries based on the pattern of the detected attack (or potential attack). In some embodiments one or more techniques described herein further suggest search queries based on the success rate (rank/score) of previous investigation queries associated with the same or similar attack patterns. The search queries can be executed within any data lake that maintains the organization's IT data (including cloud and on-prem data lakes). Generating investigation queries automatically would provide a solution that can analyze the root-cause steps that lead into a current stage of an attack, so that security analysts can accelerate their investigation process and reveal evidence that validates these steps. Thus, validating the true level of compromise within their network and would allow them (the security analysts) to act more quickly for remediating them.

One or more techniques described herein includes two primary methods. In some embodiments, the present system is configured to generate cybersecurity investigation queries based on conditional probability model. For example, the present system may generate cybersecurity investigation queries according to a cybersecurity influence diagram that utilizes for example a BBN engine (Bayesian Belief network) which may predicts the attacker's previous, and future (hidden) steps based on the detected attack patterns. The generated queries may be used to validate the existence of these predicted attack steps.

In some embodiments, the present system can generate and optimize cybersecurity investigation queries based on the level of success of previous ones. For example, the criterion for a successful cybersecurity query may differ from the criterion for a general search. While there may be some commonalities (e.g., the need for fast queries) there are also substantive differences. For example, when searching the web, a query with a lot of results can be a useful result. In contrast, in the cybersecurity realm, a query with a lot of results is generally not a useful query since the queries are adversarial and results with a lot of queries tend to be more susceptible to detection. The one or more techniques described herein improves the quality of search results for cybersecurity. For example, one or more techniques described herein may utilize searches done by other analysts to improve the current search results. In other words, the present system may be configured to recommend queries to an analyst based on a variety of factors, such as, but not limited to, previous queries by this analyst, query history of other analysts, factors of the company etc.

Accordingly, the present approach provides various investigation capabilities that conventional solutions are unable to perform. For example, one or more techniques described herein may be able to find the root cause of the attack. In some embodiments, one or more techniques described herein may provide alert vetting functionality by finding evidence that supports (or "disputes") existing security alerts and thus filter out false positives and help in prioritizing of these alerts. In some embodiments, one or more techniques described herein may provide attack scope and impact analysis. For example, the present system may find additional entities (machine, user accounts etc.) that are or were "connected" with the malicious actors, infected machines or compromised accounts and may identify all identities that are part of the attack.

In some embodiments, one or more techniques described herein may identify security posture gaps by being able to analyze attack steps that were not detected by the cybersecurity systems, thus generating a security gap analysis. In some embodiments, one or more techniques described herein may identify the potential attack scope by, for example, finding assets that could have been potentially infected or at risk based on the predicted next steps of the attack. Once the potential attack scope is identified, protective measures may be taken.

FIG. 1 is a block diagram illustrating a computing environment 100, according to example embodiments. Computing environment 100 may include an endpoint 102 and server system 104, which are communicably coupled via a network 105. While only one endpoint 102 is shown in computing environment 100, computing environment 100 is not limited to a single endpoint. For example, the present disclosure may refer to an "endpoint 102" generally or "endpoints 102" collectively. In fact, any number of endpoints can be used within the computing environment 100.

In some embodiments, computing environment 100 may include user device 124 (generally referred to herein as a "user device 124" or collectively referred to herein as "user devices 124") that is also communicably coupled to endpoints 102 and server system 104 via the network 105.

In some embodiments, environment 100 may further include one or more third party detection services 122. One or more third party detection services 122 may connect, interface, monitor, etc., endpoints 102 and server system 104. For example, third party detection services 122 may include Next-Generation Antivirus (NGAV), Endpoint Detection and Response (EDR), Intrusion Detection and Prevention systems (IDS/IPS), Cloud Work Load Protections (CWPP), Email security systems and Data Leak Protection Systems (DLP), User Entity Behavioral Analytics (UEBA), Identity and Access Management Systems (IAM), Workspace Systems (0365, Google Workspace®), system interrupts, or any other system.

In some embodiments, endpoint 102 and/or user device 124 may include one or more computing devices capable of receiving user input, transmitting and/or receiving data via the network 105, and or communicating with server system 104. In some embodiments, endpoint 102 and/or user device 124 may be representative of a computer system, such as a desktop or laptop computer. In some embodiments, endpoint 102 and/or user device 124 can be a device having computer functionality, such as a personal digital assistant (PDA), a mobile telephone, a smartphone, or other suitable device.

Network 105 may include one or more wide areas networks (WANs), metropolitan area networks (MANs), local area networks (LANs), personal area networks (PANs), or any combination of these networks. Network 105 can include a combination of one or more types of networks, such as Internet, intranet, Ethernet, twisted-pair, coaxial cable, fiber optic, cellular, satellite, IEEE 801.11, terrestrial, and/or other types of wired or wireless networks. Network 105 can also use standard communication technologies and/or protocols.

Server system 104 may include any combination of one or more of web servers, mainframe computers, general-purpose computers, personal computers, or other types of computing devices. Server system 104 may represent distributed servers that are remotely located and communicate over a communications network, or over a dedicated network such as a local area network (LAN). Server system 104 may also include one or more back-end servers for carrying out one or more aspects of the present disclosure. In some embodiments, server system 104 can include a primary server and multiple nested secondary servers for additional deployments of server system 104. This can enable greater scalability and deployability, as well as the ability to deploy asset-based severity scoring systems at a specific premises if requested by a user.

As shown, server system 104 may include Bayesian belief network (BBN) engine 110, graph analysis module 112, query generator 114, and query evaluator 116. Each of BBN engine 110, graph analysis module 112, query generator 114, and query evaluator 116 one or more software modules. The one or more software modules are collections of code or instructions stored on a media (e.g., memory of server system 104) that represent a series of machine instructions (e.g., program code) that implements one or more algorithmic steps. Such machine instructions may be the actual computer code the processor of server system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

BBN engine 110 may be configured to analyze evidence of an attack detected on any of endpoints 102. In some embodiments, BBN engine 110 may be configured with an influence diagram model that includes possible attack sequences together defined with conditional probabilities of occurrence. The influence diagram may be configured manually, generated automatically, or both, such as, for example, using a weighted combination, a max function, a min function, or other means. In some embodiments, BBN engine 110 may be configured to propagate the probabilities based on the input evidence set. As output, BBN engine 110 may generate predictions of possible historical actions (e.g., previous attacker's steps) and future attack actions.

Graph analysis module 112 may be configured to analyze the output generated by BBN engine 110. For example, graph analysis module 112 may be configured to perform a graphical analysis on the output generated by BBN engine 110 in order to classify the prediction types and filter prediction results based on pre-configured rules. In some embodiments, output from graph analysis module 112 may include filtered predictions of attack sequences in the form of, for example, MITRE ATT&CK attack steps (tactics, techniques, sub-techniques).

Query generator 114 may be configured to generate data queries based on one or more techniques. In some embodiments, query generator 114 may generate data queries based on the results generated by BBN engine 110 and graph analysis module 112. In some embodiments, query generator 114 may generate the queries based on, for example, the success rate (a score) of previous investigation queries related to the same or similar attack pattern (i.e., evidence set). Query generator 114 may save previous attack patterns and associated search queries in database 108.

In some embodiments, the investigation query to be used by query generator 114 be manually generated by, for example, a security expert accessing server system 104 using user device 124. In such embodiments, BBN engine 110 may be bypassed by the manual generation of the query.

In some embodiments, query generator 114 may generate investigation queries based on information stored in database 108. For example, query generator 114 may utilize information from identity management system (IDM) 134 in order to select specific identities within the search query, e.g., activity that may be associated with a user account, machine name, email accounts etc. Such queries may be used to search for further evidence within the data repository.

Query evaluator 116 may be configured to classify query results of investigation queries generated by query generator 114. For example, query evaluator may record both positive and negative query results in database 108 as historical data 132. In some embodiments, query evaluator 116 may classify the success of the query results. In some embodiments, query evaluator 116 may classify the success of query results based on one or more of an analysis of query bounce rates, an analysis of the number of query results, an analysis of the time spent analyzing the query result, and an analysis of consequent queries generated by the security expert.

In some embodiments, query evaluator 116 may further be configured to categorize the query results. For example, query evaluator 116 may categorize the query results by their type, such as, for example, previous step, root-cause, triage (alerts vetting) etc.

In some embodiments, query evaluator 116 may define the investigation positive results as related attack evidence. Such results may be used to enhance the evidence set input to the BBN engine 110. Thus, investigation queries that exhibit positive results may be classified with a high score (successful ones), can be used to identify more evidence results that are related to the attack.

As shown, server system 104 may be in communication with database 108. Database 108 may include raw data 130, historical data 132, and identity management system (IDM) 134. Raw data 130 may correspond to raw data logs collected by server system 104. Historical data 132 may correspond to historical queries generated by query generator 114. In some embodiments, historical data 132 may include a score generated by query evaluator 116 when evaluating the generated queries. IDM 134 may include information associated with identifies associated with server system 104.

Figure 2:
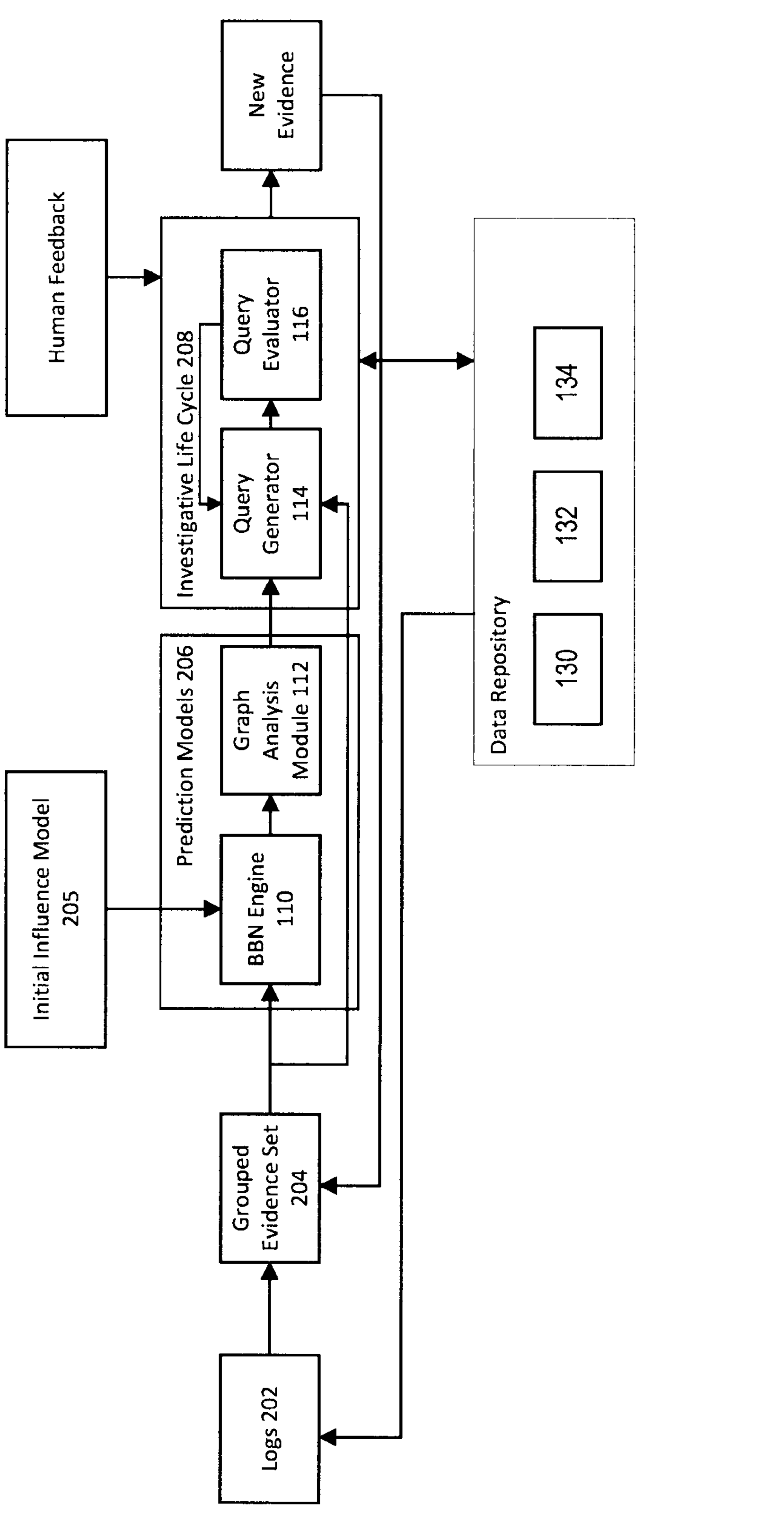
FIG. 2 is a block diagram illustrating communication among components of computing environment, according to example embodiments.

FIG. 2 is a block diagram illustrating communication among components of computing environment 100, according to example embodiments.

As shown, logs 202 may be provided to BBN engine 110. In some embodiments, logs 202 may represent security alerts, user activity logs, network traffic activity etc. In some embodiments, logs 202 may be grouped prior to input to BBN engine 110. For example, server system 104 may gather logs 202 from various network data sources, such as, but not limited to, network events such as routers, switches, packet brokers, deep packet inspection devices, firewalls, intrusion prevention etc., end points such as Antivirus and EDR agents, OS logs, etc., identity management systems such as active directory, DNS, IAM applications, etc., cloud workspace applications such as Google work space applications, Office365 applications, AWS applications etc.

Grouping logs 202 into an evidence set that represents a common malicious intent (or malicious operation) may be performed by systems such as security information and event management (STEM) systems, security orchestration, automation, and response (SOAR) systems, network traffic analysis (NTA) systems, user entity and behavior analytics (UEBA) systems, centralized logs management (CLM) systems, and the like, via security analytics engines that are based on rules or artificial intelligence methods. In some embodiments, logs 202 may be grouped based on co-occurrence in other systems. In some embodiments, individual logs that will typically represent security alerts can feed the BBN engine 110 directly without the grouping stage. Such grouping may result in grouped evidence set 204.

In some embodiments, logs 202 may be all classified by the potential attack step they might represent in the form of for example the MITRE ATT&CK frame work and terminology.

As shown, logs 202 or grouped evidence set 204 may be provided as input to prediction models 206. Prediction models 206 may include BBN engine 110 and graph analysis module 112. BBN engine 110 may analyze logs 202 or grouped evidence set 204 using influence diagram model 205. As indicated above, influence diagram model 205 may be configured manually, generated automatically, or both, such as, for example, using a weighted combination, a max function, a min function, or other means. BBN engine 110 may propagate the probabilities using influence diagram model 205 based on logs 202 or grouped evidence set 204. As output, BBN engine 110 may generate predictions of possible historical actions (e.g., previous attacker's steps) and future attack actions and may provide those predictions to graph analysis model 112.

Graph analysis module 112 may analyze the output generated by BBN engine 110 by performing, for example, a graphical analysis on the output in order to classify the prediction types and filter prediction results based on pre-configured rules.

As shown, query generator 114 and query evaluator 116 may be representative of investigation lifecycle modules 208. Investigation lifecycle modules 208 may be configured to generate the investigation queries, classify their results, score the level of success of each query based on closed and open feedbacks in order to optimize the query generation decision-making process. In some embodiments, maintaining the lifecycle of an investigation query may also include known in the art methods such as communication finite state machine that allow to recover from communication failures between the application and the data repository.

Query generator 114 may be configured to generate queries based on output generated by prediction models 206. For example, filtered prediction results or an evidence set may be sent to query generator 114. Query generator 114 may apply various methods to create and execute search queries in the data lake.

Example queries are shown below in Table 1:

TABLE 1

| Predicted investigation query type | Graph conditions rules | Other conditions rules | Search parameters | Value |
|---|---|---|---|---|
| Root cause | Predicted nodes type: Previous steps child nodes. Graph conditions: 1st child node on the path. Distance <= 5. | | The node's MITRE tag, role identity (victim or performer identity, or both) | Find the root cause of the attack and prevent further infection |
| Previous attack steps | Predicted nodes type: Previous steps child nodes. Graph conditions: Distance <= 4 NOT the 1st node in path | | The node's MITRE tag, Role identity (victim or performer identity, or both) | Evaluate the accuracy of alerts and prioritize accordingly. Understand the attacker or actor attack method and pattern |
| Gap attack step | Predicted nodes type: gap step nodes | | The node's MITRE tag, Role identity (victim or performer identity, or both) | Evaluate security posture gaps |
| Identity pivot | N/R | Pre-defined evidence nodes based on their MITRE tags, e.g., Tactic: | Search rule is defined per node MITRE tag and role information. For example: Generate a query that search for | Evaluate scope of infection |

TABLE 1-continued

| Predicted investigation query type | Graph conditions rules | Other conditions rules | Search parameters | Value |
|---|---|---|---|---|
| | | C2 Technique: Drive by Etc. | logs indicating communication with the victim or the performer of the MITRE threat tag. e.g., in case of C2 performer, search for logs that indicate any asset or user that communicate with the C2 site (domain or URL). | |
| Alert vetting (triage) | | Pre-defined evidence nodes based on their MITRE tags, e.g., Tactic: C2 Technique: Drive by Etc. | Search rule: Search for logs (evidence) originating at other data sources with the same or similar MITRE threat tag and with the same role. | Evaluate the accuracy of alerts and prioritize accordingly |

In some embodiments, query generator 114 may prioritize the investigation queries (in case of multiple proposed queries) according to the value of the prediction probabilities. For example, query generator 114 may communicate with IDM 134 to resolve all related identities associated with the victim or performer (or both) of the predicted threat, and set the search queries parameters to include these identities.

As indicated above, in some embodiments, query generator 114 may generate queries based on the success rate (a score) of previous investigation queries related to the same or similar attack pattern (i.e., evidence set). To assist with this process, attack profiles may be generated to distinguish the identity and goal of the attacker. This type of information can be useful to generate as well as to refine search results. For example, increasing the weight of queries performed by analysts on attacks with a similar profile, or generating a query based on previous queries that were used to investigate the same or similar attack pattern. Exemplary similarity metrics that may be used may include prioritizing queries based on similarities between companies, increasing weight on queries based on companies with similar industry, size, value, location, history, leadership, supply chain etc., and the like. In some embodiments, differential weights may be attached based on, for example, the reaction of the searcher. For example, queries that terminate a search pattern may be afforded greater weight.

In some cases, an adversary undertakes actions which cannot be classified. For example, when a new vulnerability is discovered by an adversary, it may be unclear what impact this activity may have. In such cases, these actions may be classified (e.g., into a MITRE class) using, for example, expectation maximization (EM) to determine what this step is likely to be. In some embodiments, this classification may be supervised or brought to the attention of a human.

Other useful information for query generator 114 in generating queries may include utilizing other detection methods such as malicious hashes, fuzzy hashes of activity (e.g., binary similarity analysis (BSA), compromised machines patterns, patterns of remediation used by other organizations, size of process tree (e.g., the number of elements connected in the process) etc.

In general searches, the exact query (e.g., the named entity) may be important. In contrast, in cybersecurity, templates such as "machine X running a process of type Y" may be utilized. Accordingly, in some embodiments, query generator 114 may utilize templates in generating the search queries. For example, query generator 114 may utilize "template extraction," in which query generator 114 may extract the core template of prior queries to discover what is or was being searched. In some embodiments, as a sub-procedure, named entity extraction may be used. In such embodiments, query generator 114 may analyze the search after replacing all named entities and numbers with fixed strings. As a result, generation of the query, or a recommendation, can then be based on a template which means that the recommendation is not dependent on the exact identity of the entities in a search.

Once the queries have been generated and utilized by query generator 114, query evaluator 116 may evaluate the level of success of the queries and rate them accordingly. Such process may improve the overall quality of the investigation queries generated by query generator 114. In some embodiments, query evaluator 116 may rate the queries by generating a score associated with each query or a query category (while high score represents a successful query).

Generally, there are a few methods query evaluator 116 may use to evaluate the query level of success. In some embodiments, query evaluator 116 may use bounce rate to evaluate the query level of success. The bounce rate in web search may be defined as the percentage of people that land on a page and leave. Analogously the bounce rate may be defined for a search as the percentage of analysts who leave from a given search result. Note, an analyst is not forced to leave a search result but can instead drill down into the details of the returned result. Results with high bounce rates are less likely to result in a satisfied analyst and thus a result with a high bounce rate can appear lower in search results.

In some embodiments, query evaluator 116 may use exit rate (termination) to evaluate the query level of success. Similarly, the exit rate may be the percentage of people that leave a specific page (even if they didn't initially land on that page). In search results, this is generally not desirable. In contrast, when investigating a cybersecurity threat, the exit rate can be a sign that the search has successfully terminated. This can depend on a variety of factors such as depth of search, dwell time (time spent on the search), similarity to other results etc. Depending on these factors, results with high exit rates may be up-ranked or downranked.

In some embodiments, another sign of termination may be actions taken by an analyst. Examples include, but are not limited to, marking the search, saving the search, terminating a process, cleaning a disk, other remediation attempts, other notetaking efforts, communication with other analyst, sending emails or any other action taken by an analysis.

In some embodiments, query evaluator 116 may use search refinement to evaluate the query level of success. When an analyst does a refinement of an existing search, this can be a sign that the original search was successful. This stands in contrast to searches on the web when a refinement shows that the original search was not accurate enough. In the context of cybersecurity analysis, however, drilling down to root causes may be a sign of a successful search. Thus, query evaluator 116 may up-rank searches that are followed by search refinement activity.

In some embodiments, query evaluator 116 may use number of results to evaluate the query level of success. The number of results may be much more significant in cybersecurity. Searches with a large number of results are less likely to be useful in cybersecurity as opposed to searches on the web. This is because the intent of a cybersecurity query is to identify a root cause. Thus, query evaluator 116 may up-rank searches with a smaller number of results.

In some embodiments, query evaluator 116 may use similar analyst profiles to evaluate the query level of success. In contrast to web search, there is a lot of information about analysts. Thus, certain analysts may be weighed differently. For example, query evaluator 116 can weigh queries generated by better analysts or more experienced analysts higher than queries generated by weaker or less experienced analysts. The system can weigh analysts in a similar role to the analyst performing the query higher.

In some embodiments, query evaluator 116 may use timespans to evaluate the query level of success. Query evaluator 116 can weigh more recent queries higher than older queries. Query evaluator 116 can weigh search patterns (or search histories) which are more similar to the pattern (search) of the current analysis.

In some embodiments, query evaluator 116 can also weigh searches based on the time of day when they occurred. Malicious actors have time patterns which means that a search used in similar times of day can be given higher weight.

In some embodiments, query evaluator 116 may use other data to evaluate the query level of success. Other signals of success may include, but are not limited to, dwell time (on the result), refinement of the search, sharing results, save query, like, subscribe, mark to send to a third party, gamification metrics. An analyst stopping to ask additional queries or leaving for the day, the number of queries used by the analyst.

In some embodiments, query evaluator 116 can also relate a query to a given malops (malicious operations activities). When the malop is marked as resolved, the system can note that the query succeeded.

Query evaluator 116 may store the historical ranked queries together with their associated evidence set (i.e., attack profile) database 108 (i.e., historical data 132).

Thus, as shown, the process of generating and evaluating investigative queries can result in a feedback loop. For example, query generator 114 may provide suggestions for cybersecurity investigation search queries based on the previously ranked or evaluated queries that were associated with similar or the same attack profiles, i.e., same or similar evidence set (similarity can be determined for example by various methods such as comparing the MITRE attack techniques or tactics etc.). In such cases, there can be multiple search queries that can be suggested, or predicted, based on the same evidence set (i.e., same or similar attack profile). Suggesting the query or queries that will be most effective may be based on the search query ranks (or scores) that were generated previously by query evaluator 116 such as: rank based on Termination/Exit criteria, rank based on the analyst level (level of expertise or seniority) that initiated the query, rank based on the dwell time, rank based on the security expert mark (e.g., mark successfully), and the like.

Further, in some embodiments, such feedback loop may assist in prioritizing the predicted or suggested queries based on ranks or scores generated by query evaluator 116.

In some embodiments, while the primary focus is on recommending search queries, this also opens the ability to prefetch search results. For example, query generator 114 may prefetch the results of the recommended queries. Query generator 114 may prefetch the results of likely queries based on the follow-up queries used by other analysts. Such process may result in maintaining the pre-fetched results in memory to allow quicker refinement. Such information may be used, for example, to estimate how long a new query will take. In such embodiments, query generator 114 may provide the estimated time to the analyst. In some embodiments, query generator 114 may factor in estimated time to its recommendations. For example, query generator 114 may provide an analyst with different options, such as "if you add word X it will take additional time Y."

Figure 3:
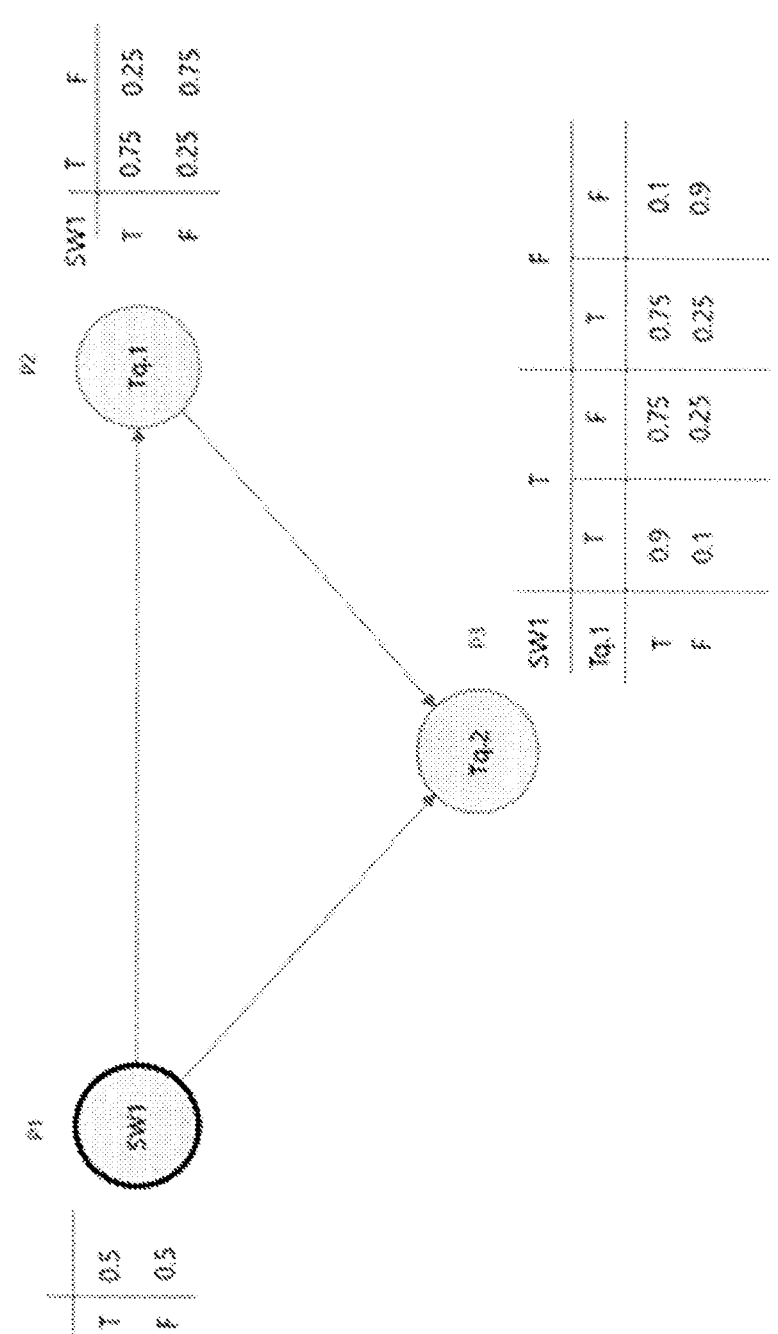
FIG. 3 illustrates an example influence diagram, according to example embodiments.

FIG. 3 illustrates an example influence diagram model 300, according to example embodiments. Influence diagram model 300 may be representative of an influence diagram model utilized by BBN engine 110.

Influence diagram model 300 may include SW.1 node. In the example shown in FIG. 3, SW.1 node may represent an item of evidence. For example, server system 104 may have observed a software that was classified as SW.1 (e.g., a keylogger). In some embodiments, the probability of an evidence may be fixed. For example, the fixing of the probability may be based on the server system's 100 triggered security lead that may provide this evidence. For example, the probability of 1 may be assigned.

As shown, if, for example, SW.1 is true, the probability that Tq.1 is the next attack state may be given by P2 table: a probability of 0.75 that Tq.1 will occur, and 0.25 it will not. If, for example, both SW.1 and Tq.1 are true, the probability that Tq.2 will occur may be given by P3 table: a probability of 0.9 that Tq.2 will occur, and 0.1 it will not. While this may be a simplistic representation of an influence diagram, others influence diagrams can include more decision parameters per each node.

In some embodiments, BBN engine 110 may be represented by a joint probability function which would allow the system to obtain answers for the following types of questions.

Next steps question: What is the probability of effect child nodes, given cause parent node(s)? For predicting this, a Post intervention joint distribution may be used as follows: Pr(Tq.2|do SW1). This function may provide the probability that Tq.2 will occur given that SW.1 was observed as evidence.

A root-cause/previous steps investigation question: What is the probability of a cause given an effect? For answering this, an inverse probability function may be used as follows: Pr(Tq.2|SW.1). This function may provide the probability that SW.1 occurred before the system observed Tq.2. Pr(Tq.2|Tq.1,SW1). This function may provide the probability that SW.1 and Tq.1 both occurred before Tq.2

Prediction of attack pathways: what is the probability of occurrences of intermediate nodes, i.e., between given cause and effect nodes.

Figure 4:
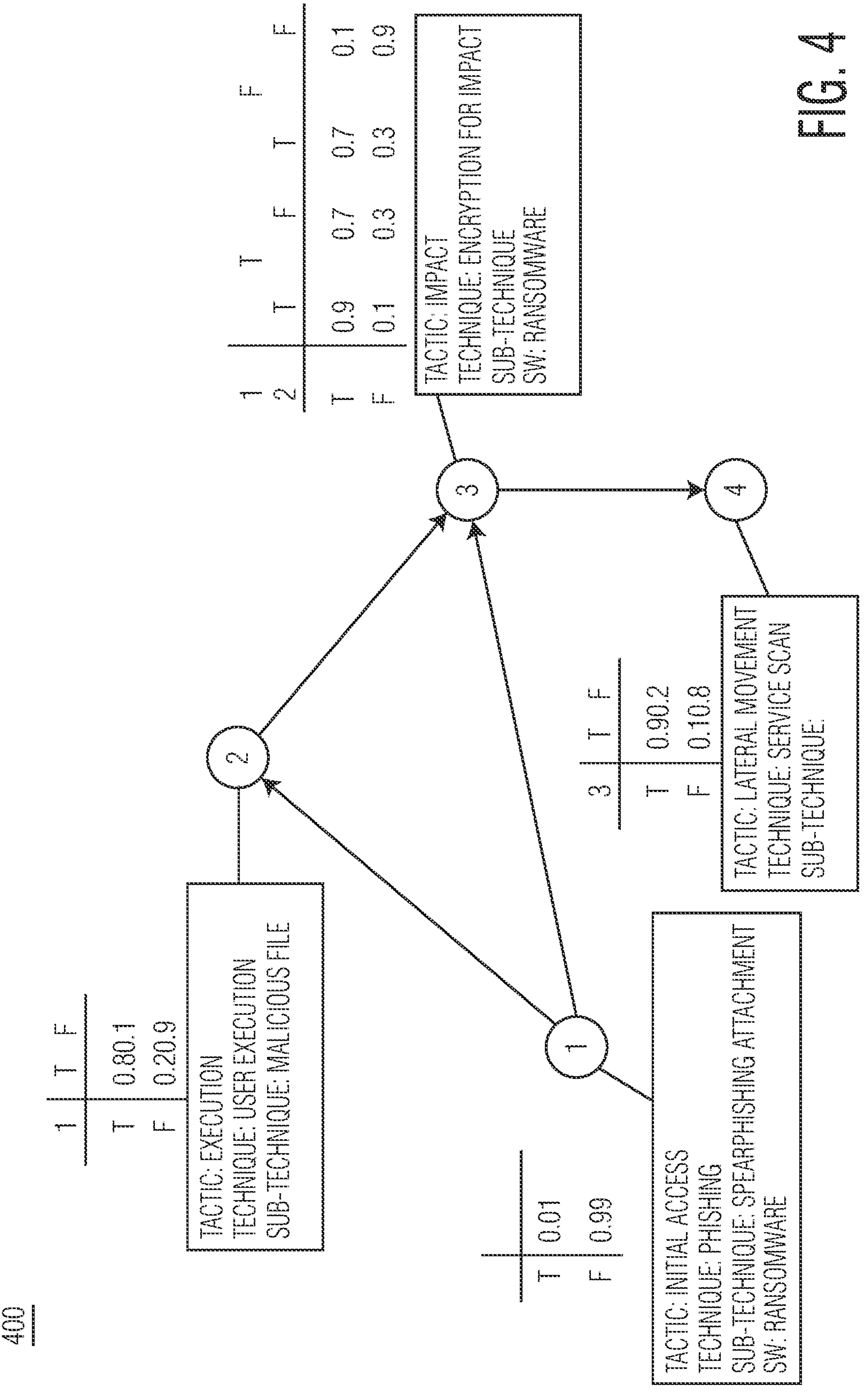
FIG. 4 illustrates an example of an influence diagram, according to example embodiments.

FIG. 4 illustrates an example of an influence diagram model 400, according to example embodiments. Influence diagram model 400 may represent possible sequences of cyber-attacks steps as described below. Each node shown FIG. 4 may represent an attack step which is represented via MITRE ATT&CK terminology.

Each node may represent an attack step, which in the above example is represented by the MITRE tactic, technique, sub-technique and software class (SW). The edges may define the cause-and-effect direction (transition direction) between the attack steps. Each node may be assigned with a conditional probability table that describes the transition probability into it from all direct connected nodes. T may represent the probability of the occurrence of the entity, while F may represent the complementary probability (sum is always 1).

Figure 5:
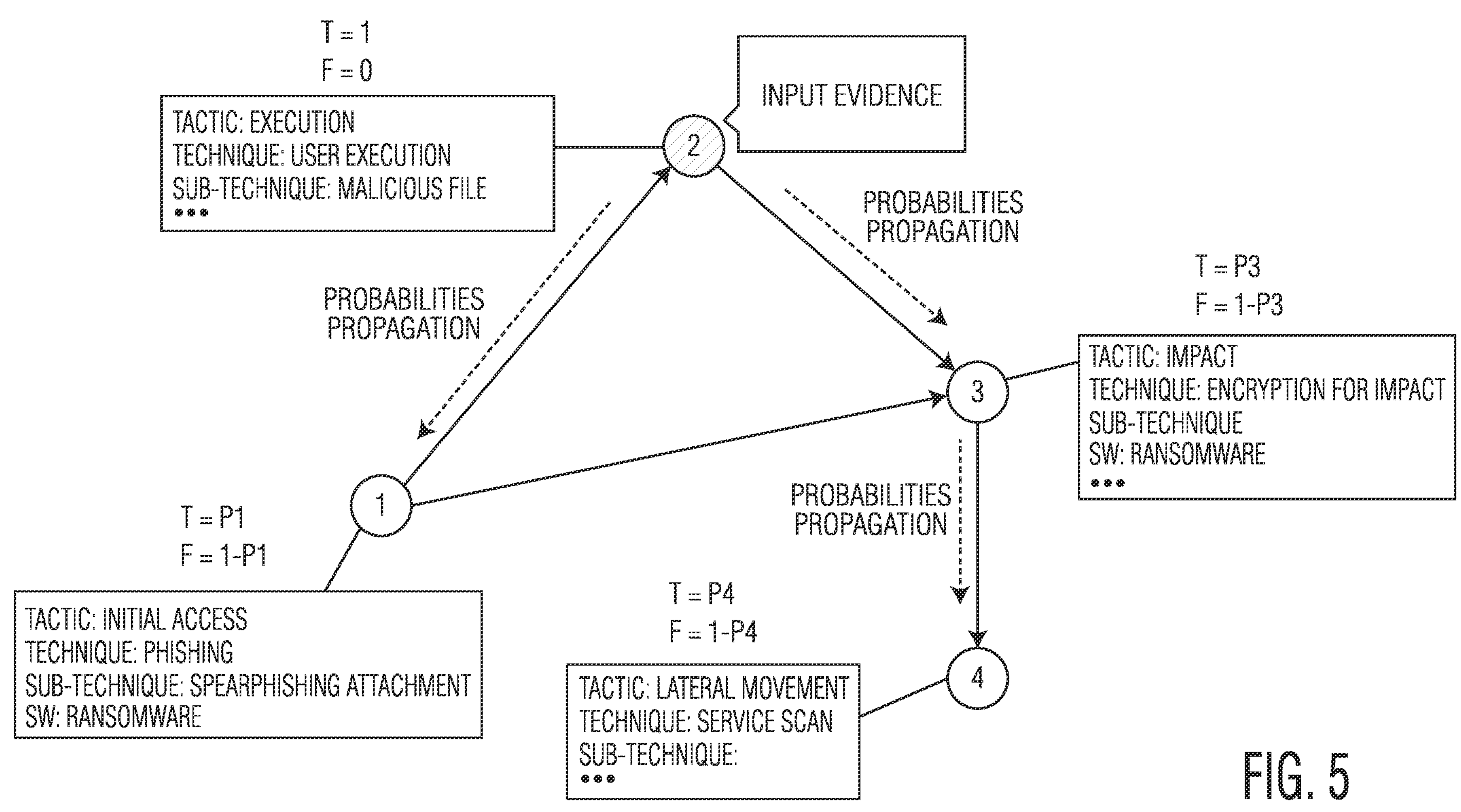
FIG. 5 is a block diagram illustrating probabilities propagation, according to example embodiments.

Once evidence is observed (e.g., a system detected the occurrence of an attack step, or multiple steps), BBN engine 1101 may propagate the probabilities through the entire network as illustrated in FIG. 5.

FIG. 5 is a block diagram illustrating probabilities propagation, according to example embodiments. As shown, node 2 may be the input evidence with 100% certainty (True state=1; False state=0). It should be noted that the model can receive multiple inputs at once, i.e., select multiple nodes. Probability propagation may take place according to all conditional probability tables and sets the prediction probabilities for all other nodes accordingly. This may include nodes that are not directly connected with the evidence node, i.e., in a distance that is bigger than 1 from the evidence node.

There may be a few possibilities to query BBN engine 110. In some embodiments, BBN engine 110 may be queried using a single evidence input. In such embodiments, one node may be set as evidence (i.e., with probability 1). In some embodiments, BBN engine 110 may be queried using multiple evidence input. For improving the accuracy and coverage of prediction BBN engine 110 may output, more than one node can be set as evidence. In some embodiments, BBN engine 110 may maintain only unique nodes which are not repeated. In some embodiments, the query to BBN engine 110 may search for the node with the exact match. In those embodiments in which no exact match is found, then the output of no match may be issued. In some embodiments, an approximate match can be made. For example, match can be made based on partial node's definition (a node is typically defined by a set of attack behavior parameters such as "Tactic," "Technique," "Sub technique," and "Software class") such as Tactic only input parameter. In some embodiments, matches can also be made where the Hamming distance or Earth movers' distance is within a predefined range.

Figure 6:
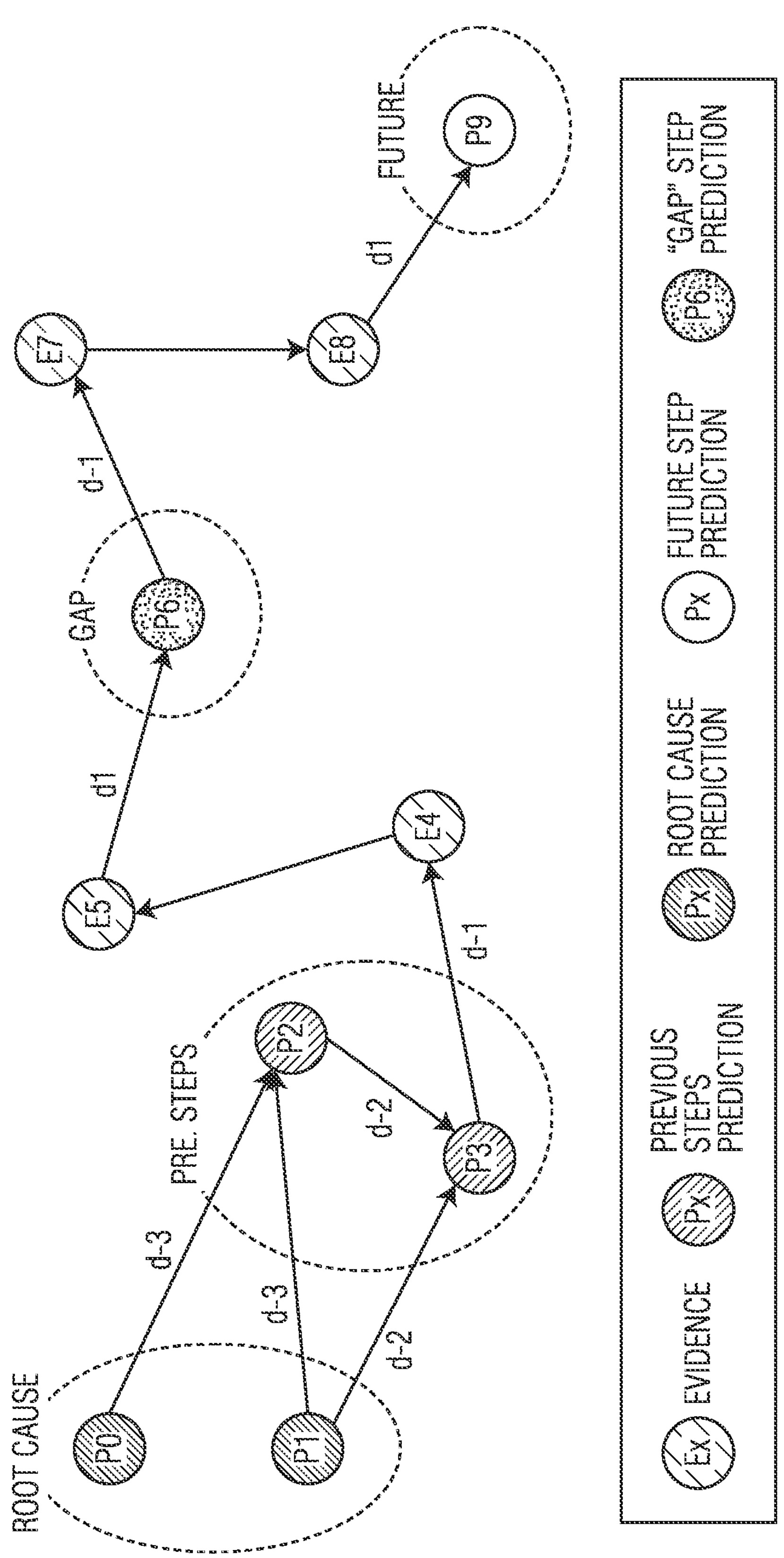
FIG. 6 illustrates exemplary graphical analysis results of prediction output generated by BBN engine, according to example embodiments.

FIG. 6 illustrates exemplary graphical analysis results 600 of prediction output generated by BBN engine 110, according to example embodiments. For example, as discussed above graph analysis module 112 may be configured to perform a graphical analysis of output generated by BBN engine 110. Accordingly, graphical analysis results 600 may be representative of a graphical analysis generated by graph analysis module 112. For example, graphical analysis results 600 may be representative of an analysis performed by graph analysis module 112 on output generated by BBN engine 110 in order to classify the type of prediction.

As shown, the output of BBN engine 110 may include a list of child nodes associated with their probability, including, but not limited to, the following nodes information:

- Probability: Child occurrence probability (true and false values)
- Description: the child's name including at least one of the following node's parameters: tactic, technique, sub-technique, software class, e.g., type of malicious software, role: Victim, or performer pf the predicted attack step, investigation actions—list of prioritized extended investigation queries (would typically serve for pivot investigation queries), etc.

In some embodiments, analyzing the output in a graphical manner may include the following results:

- Type of "prediction", including: future steps—next steps prediction, root cause attack steps predictions (which may be defined as the first node on the prediction pathway in the influence diagram), or can be configured to be in a certain distance from the evidence/parent node (e.g., with ref to the above figure, at least in distance d-2 from the "oldest" evidence (i.e., E4)), previous attack steps prediction—predicted previous steps between the given evidence and root cause node, gap predictions—prediction of nodes in between two evidence nodes on the same path, and the like.
- Distance (dx or d-x)—The distance between each evidence (parent node) and its predicted child nodes. The distance may be represented with reference to the parent evidence node, i.e., dx represent future (effect) predictions and d-x historical (cause) prediction.

In some embodiments, graph analysis results 600 may be used for filtering prediction results. In some embodiments, predictions may be restricted to a subset of the predicted nodes based on prior assumptions. For example, the size of the output to child nodes that are of interest based on their type and distance from the parent evidence node may be minimized, e.g., only predict types with no more than distance=3 from each evidence, and excluding gap nodes predictions, only nodes that breached certain probability, nodes with probability that was increased by a certain % etc.

Figure 7:
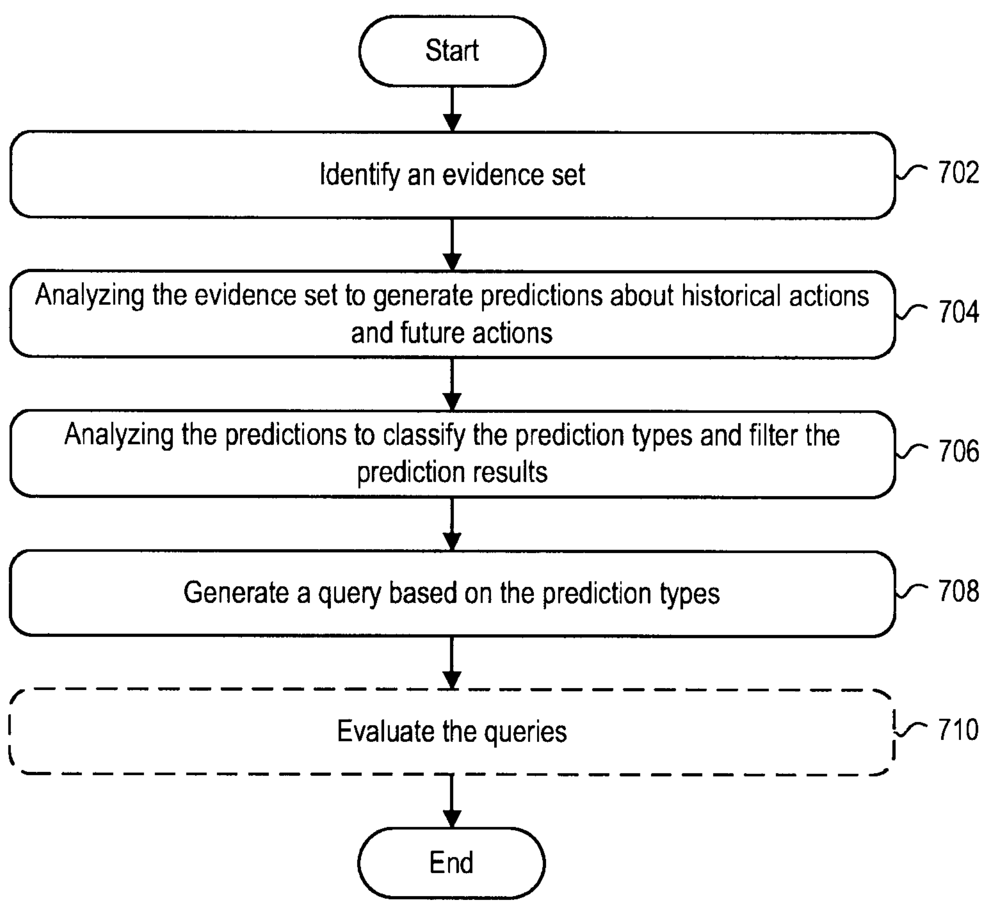
FIG. 7 is a flow diagram illustrating a method of generating search queries for analyzing or investigating a cybersecurity attack, according to example embodiments.

FIG. 7 is a flow diagram illustrating a method 700 of generating search queries for analyzing or investigating a cybersecurity attack, according to example embodiments. Method 700 may begin at step 702.

At step 702, server system 104 may identify an evidence set associated with a detected cybersecurity attack. In some embodiments, evidence set may include logs that may represent security alerts, user activity logs, network traffic activity etc. In some embodiments, server system 104 may group the logs to generate evidence set. For example, server system 104 may gather logs from various network data sources, such as, but not limited to, network events such as routers, switches, packet brokers, deep packet inspection devices, firewalls, intrusion prevention etc., end points such as Antivirus and EDR agents, OS logs, etc., identity management systems such as active directory, DNS, IAM applications, etc., cloud workspace applications such as Google work space applications, Office365 applications, AWS applications etc. Server system 104 may then group logs into an evidence set that may represent a common malicious attack.

Such grouping may be an optional process. In some embodiments, server system 104 may simply identify logs in their raw state.

At step 704, server system 104 may analyze the evidence set. For example, BBN engine 110 may analyze the evidence set and/or raw logs using an influence diagram model to generate predictions about historical actions or future actions in the detected cybersecurity attack. To analyze the evidence set or raw logs, BBN engine 110 may propagate probabilities using the influence diagram. As output, BBN engine 110 may generate predictions of possible historical actions (e.g., previous attacker's steps) and future attack actions.

At step 706, server system 104 may analyze the predictions generated by BBN engine 110. For example, graph analysis module 112 may analyze the output generated by BBN engine 110 by performing graphical analysis on the output in order to classify the prediction types and filter prediction results based on pre-configured rules. In some embodiments, graph analysis module 112 may generate, as output, filtered predictions of attack sequences in the form of, for example, MITRE ATT&CK attack steps (tactics, techniques, sub-techniques).

At step 708, server system 104 may generate queries for analyzing the cybersecurity attack. For example, query generator 114 may generate data queries based on the results generated by BBN engine 110 and graph analysis module 112. In some embodiments, query generator 114 may generate queries based on, for example, the success rate (a score) of previous investigation queries related to the same or similar attack pattern (i.e., evidence set).

In some embodiments, method 700 may include step 710. At step 710, server system 104 may evaluate the queries generated by query generator 114. For example, query evaluator 116 may analyze the query results of investigation queries generated by query generator 114. In some embodiments, query evaluator may record both positive and negative query results in a database associated with server system 104 (e.g., database 108). Query evaluator 116 may classify the success of the query results. In some embodiments, query evaluator 116 may classify the success of query results based on one or more of an analysis of query bounce rates, an analysis of the number of query results, an analysis of the time spent analyzing the query result, and an analysis of consequent queries generated by the security expert.

Such historical results may be used by query generator 114 in generating future queries for future cyberattacks.

Figures 8A, 8B:
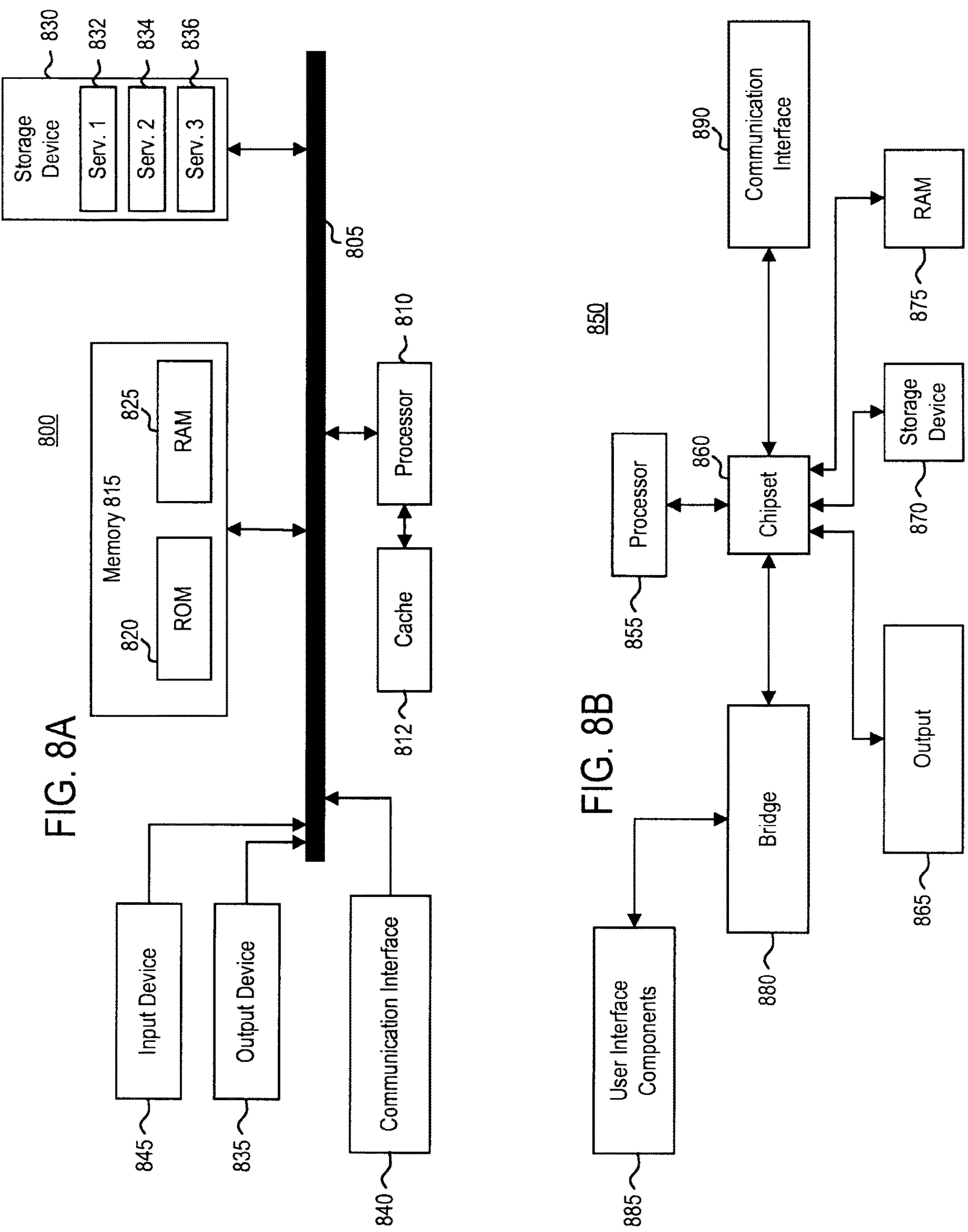
FIG. 8A illustrates a system bus computing system architecture, according to example embodiments.
FIG. 8B illustrates a computer system having a chipset architecture, according to example embodiments.

FIG. 8A illustrates an architecture of system bus computing system 800, according to example embodiments. One or more components of system 800 may be in electrical communication with each other using a bus 805. System 800 may include a processor (e.g., one or more CPUs, GPUs or other types of processors) 810 and a system bus 805 that couples various system components including the system memory 815, such as read only memory (ROM) 820 and random access memory (RAM) 825, to processor 810. System 800 can include a cache of high-speed memory connected directly with, in close proximity to, or integrated as part of processor 810. System 800 can copy data from memory 815 and/or storage device 830 to cache 812 for quick access by processor 810. In this way, cache 812 may provide a performance boost that avoids processor 810 delays while waiting for data. These and other modules can control or be configured to control processor 810 to perform various actions. Other system memory 815 may be available for use as well. Memory 815 may include multiple different types of memory with different performance characteristics. Processor 810 may be representative of a single processor or multiple processors. Processor 810 can include one or more of a general purpose processor or a hardware module or software module, such as service 1 832, service 2 834, and service 8 836 stored in storage device 830, configured to control processor 810, as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction with the system 800, an input device 845 can be any number of input mechanisms, such as a microphone for speech, a touch-sensitive screen for gesture or graphical input, keyboard, mouse, motion input, speech and so forth. An output device 835 (e.g., a display) can also be one or more of a number of output mechanisms known to those of skill in the art. In some instances, multimodal systems can enable a user to provide multiple types of input to communicate with system 800. Communication interface 840 can generally govern and manage the user input and system output. There is no restriction on operating on any particular hardware arrangement and therefore the basic features here may easily be substituted for improved hardware or firmware arrangements as they are developed.

Storage device 830 may be a non-volatile memory and can be a hard disk or other type of computer readable media that can store data that are accessible by a computer, such as magnetic cassettes, flash memory cards, solid state memory devices, digital versatile disks, cartridges, random access memories (RAMs) 825, read only memory (ROM) 820, and hybrids thereof.

Storage device 830 can include services 832, 834, and 836 for controlling the processor 810. Other hardware or software modules are contemplated. Storage device 830 can be connected to system bus 805. In one aspect, a hardware module that performs a particular function can include the software component stored in a computer-readable medium in connection with the necessary hardware components, such as processor 810, bus 805, output device 835 (e.g., a display), and so forth, to carry out the function.

FIG. 8B illustrates a computer system 850 having a chipset architecture, according to example embodiments. Computer system 850 may be an example of computer hardware, software, and firmware that can be used to implement the disclosed technology. System 850 can include one or more processors 855, representative of any number of physically and/or logically distinct resources capable of executing software, firmware, and hardware configured to perform identified computations. One or more processors 855 can communicate with a chipset 860 that can control input to and output from one or more processors 855. In this example, chipset 860 outputs information to output 865, such as a display, and can read and write information to storage device 870, which can include magnetic media, and solid-state media, for example. Chipset 860 can also read data from and write data to storage device 875 (e.g., RAM). A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 855 analyzing data stored in storage device 870 or 875. Further, the machine can receive inputs from a user through user interface components 885 and execute appropriate functions, such as browsing functions by interpreting these inputs using one or more processors 855.

It can be appreciated that example systems 800 and 850 can have more than one processor 810 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method of generating investigative queries for a cybersecurity attack comprising:

identifying, by a computing system, an evidence set associated with a detected cybersecurity attack, the evidence set comprising logs that include security alerts associated with the detected cybersecurity attack;

analyzing, by the computing system, the evidence set to predict actions taken by a malicious actor by applying an influence model to the evidence set, wherein applying the influence model comprises propagating probabilities to historical actions and future actions based on the influence model, wherein the historical actions and the future actions comprise the actions taken by the malicious actor, and wherein the influence model comprises nodes representing attack steps, edges defining cause-and-effect transition directions between the attack steps, and each node is assigned a conditional probability table that describes a transition probability into the node from directly connected nodes;

analyzing, by the computing system, the predicted actions to classify the historical actions and future actions taken by the malicious actor by analyzing the predicted historical actions and the predicted future actions, using a graph, to classify attack sequences;

generating, by the computing system, a query for analyzing the evidence set based on the classified historical actions and the future actions;

pre-fetching, by the computing system, search results of one or more related queries;

maintaining, by the computing system, the pre-fetched search results in memory; and executing, by the computing system, a search of generated query within a data repository and the memory.

2. The method of claim 1, further comprising:

predicting, by the computing system, a follow-up query to the generated query based on an analysis of historical queries; and pre-fetching, by the computing system, further search results of the follow-up query.

3. The method of claim 1, further comprising:

estimating, by the computing system, a time for processing the generated query.

4. The method of claim 1, further comprising:

evaluating, by the computing system, results from the query.

5. The method of claim 4, wherein evaluating, by the computing system, results from the query comprises:

determining a success rate of the query based on query bounce rates, number of query results, and refinement of the query.

6. The method of claim 1, wherein generating, by the computing system, the query for analyzing the evidence set based on the classified historical actions and the classified future actions comprises:

generating the query in accordance with information in an identity management system to select specific identities within the query.

7. The method of claim 1, wherein identifying, by the computing system, the evidence set associated with the detected cybersecurity attack comprises:

grouping the logs into the evidence set based on attack type.

8. The method of claim 1, wherein propagating probabilities comprises:

using a post intervention joint distribution function to determine a probability that a future attack step will occur given an observed evidence node; and using an inverse probability function to determine a probability that a previous attack step occurred before an observed evidence node.

9. The method of claim 1, further comprising filtering the classified attack sequences based on a distance between an evidence node and predicted child nodes in the graph.

10. The method of claim 1, wherein generating the query comprises generating the query based on a success rate of previous investigation queries related to a same or similar attack pattern as the evidence set.

11. A non-transitory computer readable medium comprising one or more sequences of instructions, which, when executed by a processor, causes a computing system to perform operations comprising:

identifying, by the computing system, an evidence set associated with a detected cybersecurity attack, the evidence set comprising logs that include security alerts associated with the detected cybersecurity attack;

analyzing, by the computing system, the evidence set to predict actions taken by a malicious actor by applying an influence model to the evidence set, wherein applying the influence model comprises propagating probabilities to historical actions and future actions based on the influence model, wherein the historical actions and the future actions comprise the actions taken by the malicious actor, and wherein the influence model comprises nodes representing attack steps, edges defining cause-and-effect transition directions between the attack steps, and each node is assigned a conditional probability table that describes a transition probability into the node from directly connected nodes;

analyzing, by the computing system, the predicted actions to classify the historical actions and future actions taken by the malicious actor, by analyzing the predicted historical actions and the predicted future actions, using a graph, to classify attack sequences;

generating, by the computing system, a query for analyzing the evidence set based on the classified historical actions and the future actions;

pre-fetching, by the computing system, search results of one or more related queries;

maintaining, by the computing system, the pre-fetched search results in memory; and executing, by the computing system, a search of generated query within a data repository and the memory.

12. The non-transitory computer readable medium of claim 11, further comprising:

evaluating, by the computing system, results from the query.

13. The non-transitory computer readable medium of claim 12, wherein evaluating, by the computing system, results from the query comprises:

determining a success rate of the query based on query bounce rates, number of query results, and refinement of the query.

14. The non-transitory computer readable medium of claim 11, wherein generating, by the computing system, the query for analyzing the evidence set based on the classified historical actions and the classified future actions comprises:

generating the query in accordance with information in an identity management system to select specific identities within the query.

15. The non-transitory computer readable medium of claim 11, wherein identifying, by the computing system, the evidence set associated with the detected cybersecurity attack comprises:

grouping the logs into the evidence set based on attack type.

16. A system comprising:

a processor; and a memory having programming instructions stored thereon, which, when executed by one or more processors, causes the system to perform operations comprising:

identifying an evidence set associated with a detected cybersecurity attack, the evidence set comprising logs that include security alerts associated with the detected cybersecurity attack;

analyzing the evidence set to predict actions taken by a malicious actor by applying an influence model to the evidence set, wherein applying the influence model comprises propagating probabilities to historical actions and future actions based on the influence model, wherein the historical actions and the future actions comprise the actions taken by the malicious actor, and wherein the influence model comprises nodes representing attack steps, edges defining cause-and-effect transition directions between the attack steps, and each node is assigned a conditional probability table that describes a transition probability into the node from directly connected nodes;

analyzing the predicted actions to classify the historical actions and the future actions taken by the malicious actor by analyzing the predicted historical actions and the predicted future actions, using a graph, to classify attack sequences;

generating a query for analyzing the evidence set based on the classified historical actions and the classified future actions;

pre-fetching, by the system, search results of one or more related queries;

maintaining, by the system, the pre-fetched search results in memory; and executing, by the system, a search of generated query within a data repository and the memory.

17. The system of claim 16, further comprising:

evaluating results from the query by determining a success rate of the query based on query bounce rates, number of query results, and refinement of the query.

* * * * *